R. H. HENEMIER.
COMBINED EXHAUST AND INFLATING NOZZLE FOR PNEUMATIC TIRES.
APPLICATION FILED JULY 23, 1914.
1,243,521.
Patented Oct. 16, 1917.
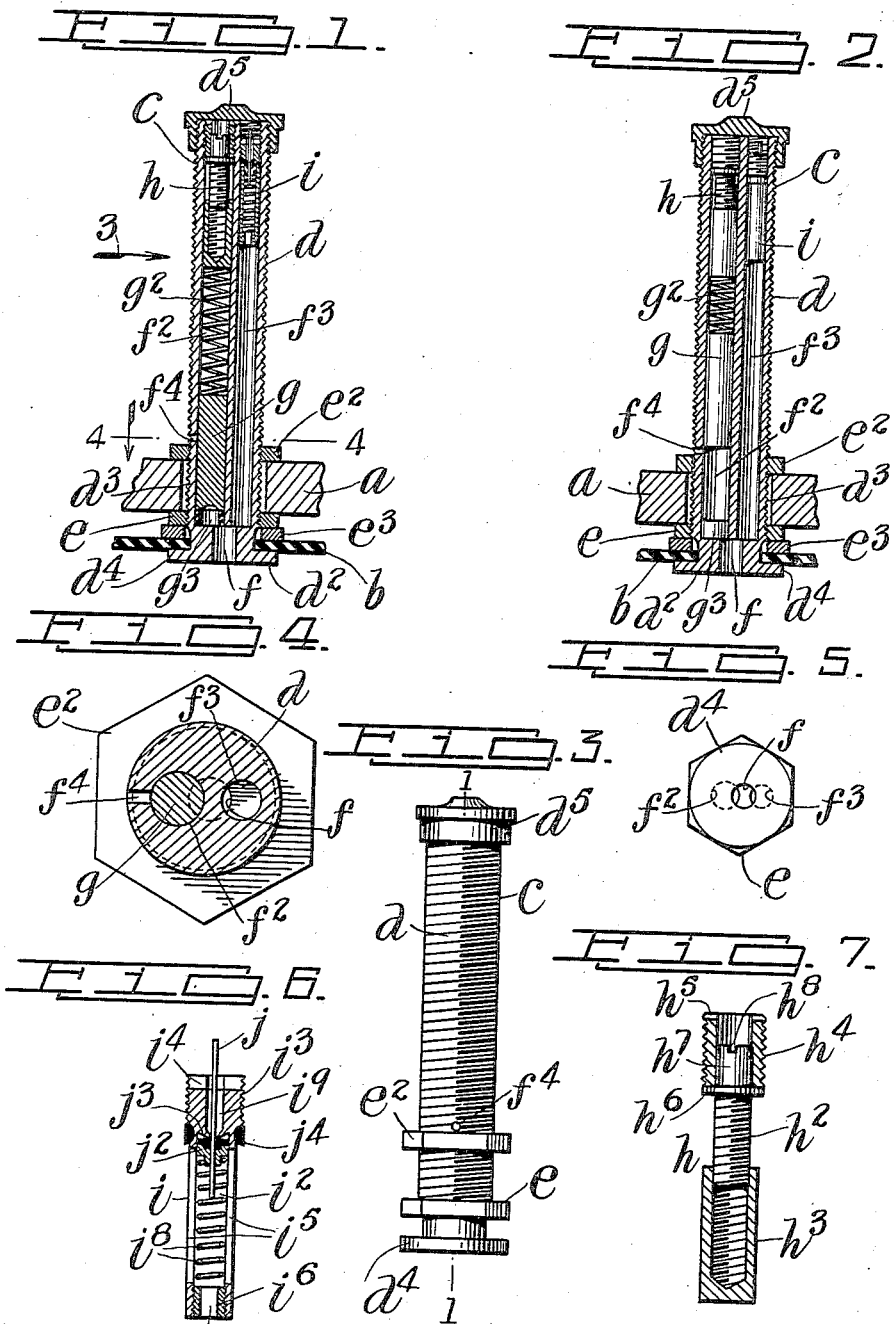
Witnesses:
H. E. Thompson
C. Mulreany
Inventor
Robert H. Henemier,
By his Attorneys

UNITED STATES PATENT OFFICE.

ROBERT H. HENEMIER, OF NEW YORK, N. Y., ASSIGNOR TO A. SCHRADER'S SON, INCORPORATED, OF BROOKLYN, NEW YORK, A CORPORATION OF NEW YORK.

COMBINED EXHAUST AND INFLATING NOZZLE FOR PNEUMATIC TIRES.

1,243,521.   Specification of Letters Patent.   Patented Oct. 16, 1917.

Application filed July 23, 1914. Serial No. 852,567.

*To all whom it may concern:*

Be it known that I, ROBERT H. HENEMIER, a citizen of the United States, and residing at New York, in the county of New York and State of New York, have invented certain new and useful Improvements in Combined Exhaust and Inflating Nozzles for Pneumatic Tires, of which the following is a specification, such as will enable those skilled in the art to which it appertains to make and use the same.

This invention relates to pressure exhaust devices, and inflating devices for pneumatic tires, and the object thereof is to provide an improved combination device of this class through which a tire may be inflated whenever desired and which will also automatically operate as an exhaust device to relieve any over-pressure in the tire whenever such pressure rises beyond a pre-determined point from any cause.

The invention is fully disclosed in the following specification of which the accompanying drawing forms a part, in which the separate parts of my improvement are designated by suitable reference characters in each of the views, and in which;—

Figure 1 is a sectional view of my improved combination exhaust valve device and inflating nozzle device and showing the same applied;—

Fig. 2 a view similar to Fig. 1 but showing the parts in a different position;—

Fig. 3 a side view of the device detached and looking in the direction of the arrow 3 of Fig. 1.

Fig. 4 a section on the line 4—4 of Fig. 1.

Fig. 5 a bottom plan view of the device as shown in Fig. 3.

Fig. 6 a view similar to Fig. 1 but showing only the air valve inflating device detached and showing the same on an enlarged scale, and;—

Fig. 7 a view similar to Fig. 1 but showing only the adjusting device for the exhaust valve and showing the same on an enlarged scale.

In the drawing forming part of this specification, I have shown at $a$ a part of the rim of a wheel of an automobile or similar vehicle, and at $b$ a part of the inner or inflatable tube of a pneumatic tire, and in connection therewith I have shown at $c$ my improved combination pressure exhaust device and inflating nozzle, for the tire.

In the construction of this device, I provide a tubular barrel or casing $d$ which is adapted to be connected with the inflatable tube $b$ and to be passed inwardly through the rim $a$ and to be secured therein. The barrel or casing $d$ is provided at its inner end with an annular flange or head $d^2$ and said barrel or casing, where it passes through the rim $a$, is threaded on its outer side and this thread preferably extends the full length of said barrel or casing and mounted on said barrel or casing, inwardly of the rim $a$, is a nut $e$ and another nut $e^2$ is also mounted on said barrel or casing outwardly of said rim and between the flange or head $d^2$ and the nut $e$ is an annular groove or space $d^4$, in which is placed a packing ring or gasket $e^3$.

The inner end of the casing $d$ is provided with a single tubular passage $f$ and the body portion of said casing is provided with two parallel independent bores or passages $f^2$ and $f^3$ which communicate with the tubular passage $f$ and the bores or passages $f^2$ and $f^3$ open through the outer end of said casing and are closed by the cap $d^5$ when the device is in use, and the bore or passage $f^2$ is the exhaust bore or passage while, the bore or passage $f^3$ is the inflating bore or passage.

Placed in the bore or passage $f^2$ is a cylindrical exhaust valve $g$ which is adapted to open and close an exhaust port $f^4$ in the tubular casing $d$, adjacent to the rim $a$ of the wheel, and in the outer end of the bore or passage $f^2$ is placed an exhaust valve control device $h$ which is shown detached in Fig. 7 and between which and the exhaust valve $g$ is placed a spiral spring $g^2$.

The exhaust valve control device $h$ comprises a central screw member $h^2$ having an inner tubular threaded head or sleeve $h^3$ which is screwed thereonto, and the outer end of the screw member $h^2$ is provided with a loose sleeve head $h^4$ which is threaded on its outer side and adapted to be screwed into the exhaust bore or passage $f^2$ and said sleeve $h^4$ is provided with a transverse recess $h^5$ whereby an ordinary screw driver or spanner may be used in connection therewith, and the screw member $h^2$ is provided with a collar $h^6$ on which the sleeve $h^4$ bears.

At the inner end of the exhaust valve $g$, the exhaust bore or passage $f^2$ is provided with an annular packing $g^3$ and the outer end or head portion $h^7$ of the screw member $h^2$ is provided with a transverse recess $h^8$, and when these parts have been assembled as shown in Fig. 1, an ordinary screw driver may be inserted through the sleeve $h^4$, to turn the screw member $h^2$, and pressure on the spring $g^2$, and on the exhaust valve $g$, may be regulated as will be readily understood.

Within the outer end of the inflating bore of passage $f^3$ is placed an inflating valve device $i$, shown in full lines in Fig. 2 and in section in Fig. 1, and detached and in section in Fig. 6, and the section in Fig. 6 is at right angles to the section in Fig. 1, and this device comprises a tube $i^2$ provided at its outer end with a tubular and threaded head $i^3$ having a transverse recess $i^4$ to receive the edge of a screw driver or a similar instrument. The tube $i^2$ is provided in its opposite sides with longitudinal slots $i^5$, and in the inner end thereof is secured a tubular plug $i^6$ forming a port or passage $i^7$, and placed in the tube $i^2$ and bearing on the plug $i^6$ is a spiral spring $i^8$.

Freely movable through the head $i^3$ of the tube $i^2$ is a valve pin $j$ on the inner portion of which is secured a valve $j^2$ on which is placed a packing $j^3$, and the outer end portion of the spring $i^8$ bears on the valve $j^2$ and normally holds it in position to close the tubular bore or passage $i^9$ through the head $i^3$, and said head $i^3$ is also provided with an annular packing $j^4$ which is fitted in a corresponding groove in the inner end portion of said head.

The outer end of the tubular bore or passage $f^3$ is threaded, and in assembling these parts the tube $i^2$ of the inflating valve device is inserted into said bore or passage $f^3$ and the head $i^3$ of the valve device $i$ is screwed into said bore or passage until it is counter-sunk therein as clearly shown in Fig. 1 after which the cap $d^5$ is screwed on to the tubular casing $c$.

In the normal position of the parts, the valve pin $j$ projects slightly above or beyond the head $i^3$ of the inflating valve device as clearly shown in Figs. 1, 2, and 6, and in the operation of inflating the tire the cap $d^5$ is removed and an ordinary inflating tube inserted into the outer end of the bore or passage $f^3$ and this operation forces the valve $j^2$ inwardly and the air passes through the head $i^3$ into the tubular body $i^2$ of the valve device $i$, and out through the slots $i^5$ around the valve $j^2$ and then back through said slots into the tubular part and through the port or passage $i^7$ and in through the tubular bore or passage $f^3$ and the port or passage $f$ into the tire.

From the foregoing description it will be seen that the exhaust pressure regulator may be adjusted to work, or be operated by any pre-determined pressure within the tire by simply turning the screw member $h^2$ as this operation will move the sleeve head $h^3$ toward or away from the spring $g^2$ according to the direction in which the screw member $h^2$ is turned, and whenever pressure in the tire reaches a predetermined point the exhaust valve $g$ will be forced outwardly as shown in Fig. 2, and the over-pressure within the tire will be exhausted through port or passage $f^4$, and the operation of inflating the tire will be readily understood from the foregoing description.

The working parts of my improvement, as well as the tubular case $d$ are all made of material that will not corrode or rust and the device is practically indestructible, and the cap $d^5$ protects and guards the outer end parts of the device when in use, and said cap may be detached for the purpose herein specified whenever necessary, and the entire device complete and ready for use may be applied to any rim and tire construction in the usual manner and without in any way changing the same.

The packings at $g^3$, $j^2$ and $j^4$ may be renewed at any time and the other operative parts of the device are practically indestructible, and the separate parts may be disconnected for cleaning or other purposes if at any time such operation should be deemed necessary, and while I have shown and described the preferred form and construction of the various parts of my improvement, my invention is not limited thereto, and changes therein and modifications thereof may be made, within the scope of the appended claims without departing from the spirit of my invention or sacrificing its advantages.

My improved combination pressure exhaust, and inflating device, may be connected with the tube $b$ by the manufacturer or it may be connected with said tube by anyone at any time, and in this operation, the flange or head $d^2$, is forced inwardly through a corresponding aperture in said tube which is of less dimensions than the flange or head $d^4$ but which may be expanded to permit of this operation. After the barrel or casing has been connected with the tube $b$, the nut $e$ is screwed down on the packing or gasket $e^2$ and after the barrel or casing has been passed through the rim $a$, the nut $e^2$ is screwed onto said barrel or casing and tightly down upon said rim.

Having fully described my invention what I claim as new and desire to secure by Letters Patent, is:—

1. A combined inflating and exhaust valve for pneumatic tires comprising a one piece standard size stem member adapted to be secured directly to a tire, said stem having an inlet duct, a valve for the inlet duct, an exhaust duct in the stem, a rubber seal positioned in the inner end of the exhaust duct, an outwardly yielding valve for the exhaust duct having an annular edge portion engaging with the seal, a spring in the exhaust duct bearing on the valve therein, an expansible member engaging the spring, said expansible member having a longitudinally stationary head arranged wholly within the duct adjacent the mouth thereof, a holding shoulder therein, a sleeve threaded thereon and a sleeve threaded in the mouth of the exhaust duct and abutting the shoulder to retain the expansible member within the duct.

2. A combined inflating and exhaust valve for pneumatic tires comprising a stem member adapted to be secured to a tire, said stem having an inlet duct, a valve for the inlet duct, an exhaust duct in the stem, an outwardly yielding valve for the exhaust duct, a spring in the exhaust duct bearing on the valve therein, an expansible member engaging the spring, said expansible member having a longitudinally stationary head arranged wholly within the duct adjacent the mouth thereof, said head being provided with means to be engaged by a tool and a securing sleeve threaded in the mouth of the exhaust duct and engaging the expansible member to retain the later within the duct.

3. A tire valve for pneumatic tires comprising a stem member, said stem having an exhaust duct, yielding valve for the exhaust duct, a spring in the exhaust duct bearing on the valve therein, an expansible bearing member for said spring, said expansible member having a longitudinally stationary head arranged wholly within the duct adjacent the mouth thereof, said head being provided with means to be engaged by a manipulating tool and a securing sleeve threaded in the mouth of the exhaust duct and engaging the expansible member to retain the latter within the duct.

In testimony that I claim the foregoing as my invention I have signed my name in presence of the subscribing witnesses this 21st day of July, 1914.

ROBERT H. HENEMIER.

Witnesses:
C. MULREANY,
E. CHESTER.